United States Patent
Yang et al.

(10) Patent No.: US 10,859,874 B2
(45) Date of Patent: Dec. 8, 2020

(54) LIQUID CRYSTAL DISPLAY APPARATUS

(71) Applicant: Samsung Display Co., Ltd., Yongin-si (KR)

(72) Inventors: Gihoon Yang, Yongin-si (KR); Sarang Gahng, Yongin-si (KR); Kyungha Moon, Yongin-si (KR); Bumsuk Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 116 days.

(21) Appl. No.: 16/160,428

(22) Filed: Oct. 15, 2018

(65) Prior Publication Data

US 2019/0302498 A1 Oct. 3, 2019

(30) Foreign Application Priority Data

Apr. 3, 2018 (KR) .......................... 10-2018-0098738

(51) Int. Cl.
*G02F 1/1337* (2006.01)
*C09K 19/56* (2006.01)
*G02F 1/137* (2006.01)

(52) U.S. Cl.
CPC ............ *G02F 1/1337* (2013.01); *C09K 19/56* (2013.01); *G02F 1/133723* (2013.01);
(Continued)

(58) Field of Classification Search
CPC ............ G02F 1/1337; G02F 1/133753; G02F 1/133723; G02F 1/133788;
(Continued)

(56) References Cited

U.S. PATENT DOCUMENTS 5,309,263 A * 5/1994 Sato ................. G02F 1/133711
349/122
2016/0032190 A1 2/2016 Lim et al.
(Continued)

FOREIGN PATENT DOCUMENTS

KR 10-2016-0016600 2/2016
KR 10201701404079 9/2017
(Continued)

*Primary Examiner* — Ruiyun Zhang
(74) *Attorney, Agent, or Firm* — F. Chau & Associates, LLC

(57) ABSTRACT

Provided is a liquid crystal display apparatus. The liquid crystal display apparatus includes: a first substrate; a second substrate facing the first substrate; a liquid crystal layer disposed between the first substrate and the second substrate; a first liquid crystal alignment layer disposed between the first substrate and the liquid crystal layer; and a second liquid crystal alignment layer disposed between the second substrate and the liquid crystal layer. The first liquid crystal alignment layer may include a first ion adsorbing group, and the second liquid crystal alignment layer may include a second ion adsorbing group. A content of the first ion adsorbing group in the first liquid crystal alignment layer may be different from that of the second ion adsorbing group in the second liquid crystal alignment layer, or a chemical structure of the first ion adsorbing group may be different from that of the second ion adsorbing group.

18 Claims, 4 Drawing Sheets

(52) U.S. Cl.
CPC .... *G02F 1/133753* (2013.01); *C09K 2323/00* (2020.08); *C09K 2323/02* (2020.08); *C09K 2323/027* (2020.08); *G02F 1/137* (2013.01); *G02F 1/133788* (2013.01); *G02F 2001/13712* (2013.01); *G02F 2001/133726* (2013.01); *G02F 2001/133742* (2013.01); *G02F 2001/133757* (2013.01); *G02F 2001/133773* (2013.01)

(58) Field of Classification Search
CPC ........ G02F 2001/133742; G02F 2001/133757; G02F 2001/133726; G02F 2001/133773; C09K 19/55; Y10T 428/10; Y10T 428/1005; Y10T 428/0123
USPC ........ 428/1.1, 1.2, 1.25, 1.26; 349/123, 128, 349/129
See application file for complete search history.

(56) References Cited

U.S. PATENT DOCUMENTS

2016/0209708 A1* 7/2016 Lim ................. G02F 1/133711
2017/0255061 A1 9/2017 Yang et al.

FOREIGN PATENT DOCUMENTS

| WO | 2011074546 | 6/2011 |
| WO | 2014171493 | 10/2014 |

* cited by examiner

LIQUID CRYSTAL DISPLAY APPARATUS

CROSS-REFERENCE TO RELATED APPLICATION

This application claims the benefit under 35 U.S.C. § 119 of Korean Patent Application No. 10-2018-0038738, filed on Apr. 3, 2018, in the Korean Intellectual Property Office, the disclosure of which is incorporated by reference herein in its entirety.

TECHNICAL FIELD

Exemplary embodiments of the present inventive concept relate to a liquid crystal display apparatus.

DISCUSSION OF RELATED ART

With the rapid development of various electronic devices such as mobile phones, PDAs, computers, and large-sized TVs recently, there has been an increasing demand for flat panel display apparatuses. Among the flat panel display apparatuses, a liquid crystal display (LCD) apparatus has advantages such as low power consumption, easy display of moving images, and high contrast ratio.

A liquid crystal display apparatus includes a liquid crystal layer disposed between two substrates. An electric field is applied to the liquid crystal layer to change the alignment direction of liquid crystal molecules to thereby change the polarization direction of incident light. This change is interlocked with a polarizer to control transmission of the incident light, thereby displaying an image.

Examples of liquid crystal display apparatuses include vertically aligned mode liquid crystal display apparatuses, which drive liquid crystals by using an electric field formed in a vertical direction of a substrate, and in-plane switching mode liquid crystal display apparatuses, which utilize a horizontal electric field parallel to a substrate.

The vertically aligned mode liquid crystal display apparatus has excellent contrast ratio. Further, to secure wide viewing angle and high aperture ratio for the vertically aligned mode liquid crystal display apparatus, the liquid crystal layer region corresponding to one pixel is divided into a plurality of domains, and the liquid crystal molecules in each domain have different pretilt angles.

When a liquid crystal display apparatus is used for a relatively large-sized TV or the like, a visual difference may occur between the center and both ends of the screen. To compensate for such a visual difference, the liquid crystal display apparatus may be formed in a curved shape.

SUMMARY

Exemplary embodiments of the present inventive concept provide a liquid crystal display apparatus that has less discoloration and enhanced voltage holding ratio (VHR).

Additional aspects will be set forth in part in the description which follows and, in part, will be apparent from the description, or may be learned by practice of the presented exemplary embodiments.

According to an exemplary embodiment of the present inventive concept, a liquid crystal display (LCD) apparatus includes: a first substrate; a second substrate facing the first substrate; a liquid crystal layer disposed between the first substrate and the second substrate; a first liquid crystal alignment layer disposed between the first substrate and the liquid crystal layer; and a second liquid crystal alignment layer disposed between the second substrate and the liquid crystal layer, in which the first liquid crystal alignment layer may include a first ion adsorbing group, and the second liquid crystal alignment layer may include a second ion adsorbing group. A content of the first ion adsorbing group in the first liquid crystal alignment layer may be different from that of the second ion adsorbing group in the second liquid crystal alignment layer, or a chemical structure of the first ion adsorbing group may be different from that of the second ion adsorbing group.

According to an exemplary embodiment of the present inventive concept, the chemical structure of the first ion adsorbing group may be identical to that of the second ion adsorbing group, and the content of the first ion adsorbing group in the first liquid crystal alignment layer may be different from that of the second ion adsorbing group in the second liquid crystal alignment layer; or the chemical structure of the first ion adsorbing group may be different from that of the second ion adsorbing group, and the content of the first ion adsorbing group in the first liquid crystal alignment layer may be identical to that of the second ion adsorbing group in the second liquid crystal alignment layer.

According to an exemplary embodiment of the present inventive concept, the chemical structure of the first ion adsorbing group may be identical to that of the second ion adsorbing group, and the content of the first ion adsorbing group in the first liquid crystal alignment layer may be greater than that of the second ion adsorbing group in the second liquid crystal alignment layer; or an ion adsorbing reactivity of the first ion adsorbing group may be higher than that of the second ion adsorbing group, and the content of the first ion adsorbing group in the first liquid crystal alignment layer may be identical to that of the second ion adsorbing group in the second liquid crystal alignment layer.

According to an exemplary embodiment of the present inventive concept, the first ion adsorbing group and the second ion adsorbing group may each be represented by Formula 1:

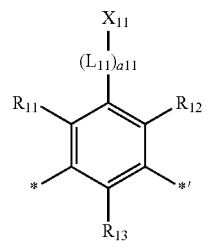

Formula 1 in Formula 1, $X_{11}$ may be a substituted or unsubstituted $C_1$-$C_{60}$ heterocyclic group, $L_{11}$ may be selected from *—$\{C(R_{14})(R_{15})\}_{n11}$—O—$\{C(R_{16})(R_{17})\}_{n12}$—*', *—$\{C(R_{14})(R_{15})\}_{n11}$—C(=O)O—$\{C(R_{16})(R_{17})\}_{n12}$—*', and *—$\{C(R_{14})(R_{15})\}_{n11}$—OC(=O)—$\{C(R_{16})(R_{17})\}_{n12}$—*', n11 and n12 may each independently be selected from 0, and 3, a11 may be selected from 0, 1, 2, and 3, $R_{11}$ to $R_{17}$ may each independently be selected from hydrogen, deuterium, —F, —Cl, —Br, —I, a hydroxyl group, a cyano group, a nitro group, a substituted or unsubstituted $C_1$-$C_{20}$ alkyl group, a substituted or unsubstituted $C_1$-$C_{20}$ alkoxy group, a substituted or unsubstituted $C_5$-$C_{60}$ carbocyclic group, and a substituted or unsubstituted $C_1$-$C_{60}$ heterocyclic group, and

* and *' may each indicate a binding site to an adjacent atom.

According to an exemplary embodiment of the present inventive concept, the first ion adsorbing group and the second ion adsorbing group may be represented by one of Formulae 1-1 to 1-16:

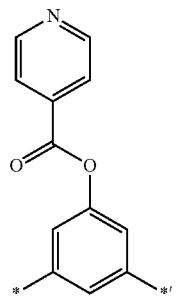

1-1

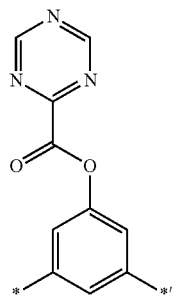

1-2

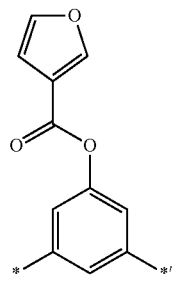

1-3

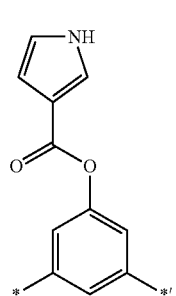

1-4

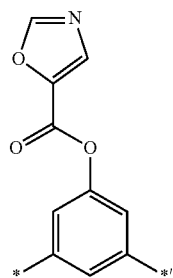

1-5

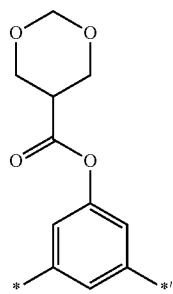

1-6

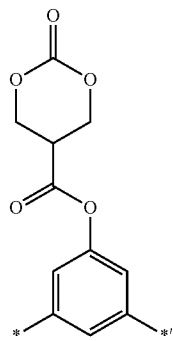

1-7

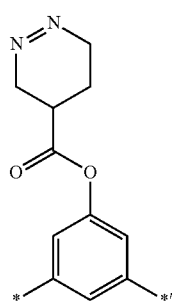

1-8

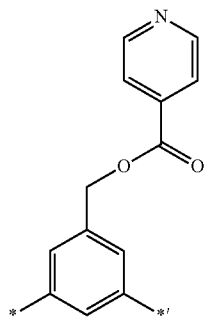

1-9

1-10
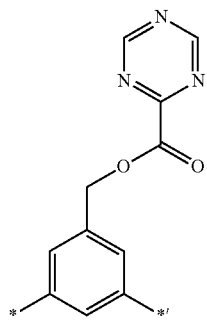

1-11
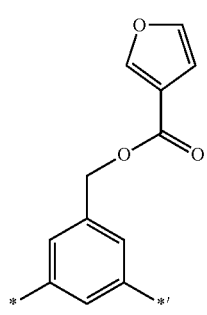

1-12
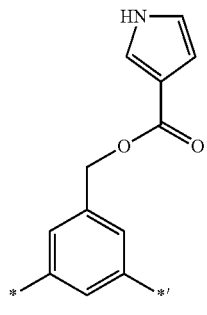

1-13
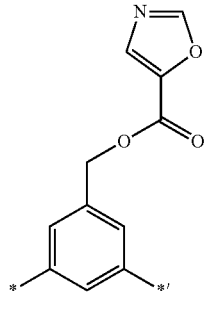

1-14
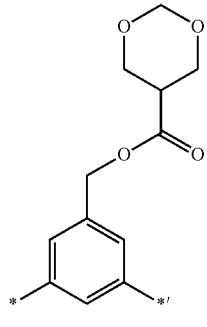

1-15
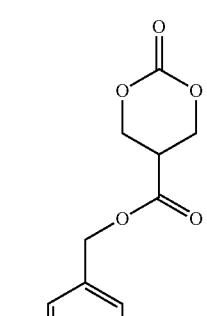

1-16
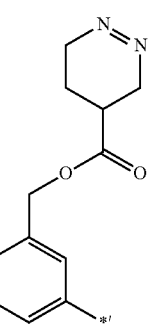

in Formulae 1-1 to 1-16,

* and *' may each indicate a binding site to an adjacent atom.

According to an exemplary embodiment of the present inventive concept, a mesogen content of the first liquid crystal alignment layer may be different from that of the second liquid crystal alignment layer.

According to an exemplary embodiment of the present inventive concept, a mesogen content of the first liquid crystal alignment layer may be smaller than that of the second liquid crystal alignment layer.

According to an exemplary embodiment of the present inventive concept, the first liquid crystal alignment layer may not include a polymerization initiating group, and the second liquid crystal alignment layer may further include a polymerization initiating group.

According to an exemplary embodiment of the present inventive concept, the polymerization initiating group may be represented by one of Formulae 2-1 to 2-6:

2-1
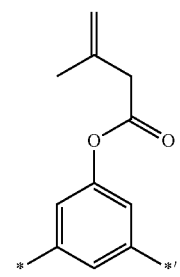

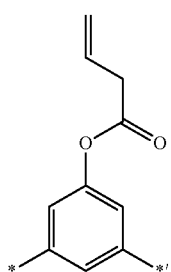

2-2

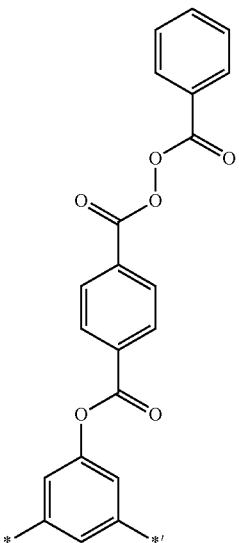

2-6 in Formulae 2-1 to 2-6,

\* and \*' may each indicate a binding site to an adjacent atom.

According to an exemplary embodiment of the present inventive concept, the first liquid crystal alignment layer may further include a vertical alignment group.

According to an exemplary embodiment of the present inventive concept, the vertical alignment group may be represented by one of Formulae 4-1 to 4-4:

4-1

4-2

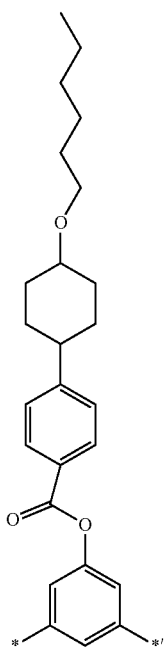

4-4

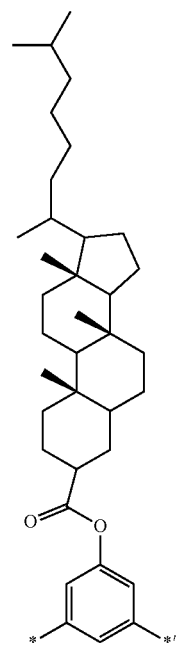

4-3

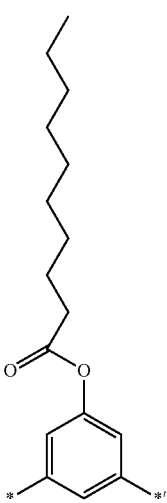

in Formulae 4-1 to 4-4,

* and *' may each indicate a binding site to an adjacent atom.

According to an exemplary embodiment of the present inventive concept, the first liquid crystal alignment layer and the second liquid crystal alignment layer may each include an imide repeating unit.

According to an exemplary embodiment of the present inventive concept, at least a portion of the first substrate and at least a portion of the second substrate may each include a curved shape.

According to an exemplary embodiment of the present inventive concept, the LCD apparatus may further include: a common electrode disposed between the first substrate and the first liquid crystal alignment layer; and a pixel electrode disposed between the second substrate and the second liquid crystal alignment layer.

According to an exemplary embodiment of the present inventive concept, an LCD apparatus includes: a first curved substrate; a second curved substrate facing the first curved substrate; a liquid crystal layer disposed between the first curved substrate and the second curved substrate; a first liquid crystal alignment layer disposed between the first curved substrate and the liquid crystal layer; and a second liquid crystal alignment layer disposed between the second curved substrate and the liquid crystal layer, in which the first liquid crystal alignment layer may include a first ion adsorbing group, and the second liquid crystal alignment layer may include a second ion adsorbing group. A content of the first ion adsorbing group in the first liquid crystal alignment layer may be different from that of the second ion adsorbing group in the second liquid crystal alignment layer, or the first ion adsorbing group may be different from the second ion adsorbing group.

According to an exemplary embodiment of the present inventive concept, a chemical structure of the first ion adsorbing group may be identical to that of the second ion adsorbing group, and the content of the first ion adsorbing group in the first liquid crystal alignment layer may be different from that of the second ion adsorbing group in the second liquid crystal alignment layer; or the chemical structure of the first ion adsorbing group may be different from that of the second ion adsorbing group, and the content of the first ion adsorbing group in the first liquid crystal alignment layer may be identical to that of the second ion adsorbing group in the second liquid crystal alignment layer.

According to an exemplary embodiment of the present inventive concept, a chemical structure of the first ion adsorbing group may be identical to that of the second ion adsorbing group, and the content of the first ion adsorbing group in the first liquid crystal alignment layer may be greater than that of the second ion adsorbing group in the second liquid crystal alignment layer; or an ion adsorbing reactivity of the first ion adsorbing group may be higher than that of the second ion adsorbing group, and the content of the first ion adsorbing group in the first liquid crystal alignment layer may be identical to that of the second ion adsorbing group in the second liquid crystal alignment layer.

According to an exemplary embodiment of the present inventive concept, the first liquid crystal alignment layer may not include a polymerization initiating group, and the second liquid crystal alignment layer may further include a polymerization initiating group.

According to an exemplary embodiment of the present inventive concept, the first ion adsorbing group and the second ion adsorbing group may each be represented by Formula 1.

According to an exemplary embodiment of the present inventive concept, the first ion adsorbing group and the second ion adsorbing group may each be represented by one of Formulae 1-1 to 1-16.

BRIEF DESCRIPTION OF THE DRAWINGS

These and/or other aspects will become apparent and more readily appreciated from the following description of the exemplary embodiments, taken in conjunction with the accompanying drawings in which.

Figure 1:
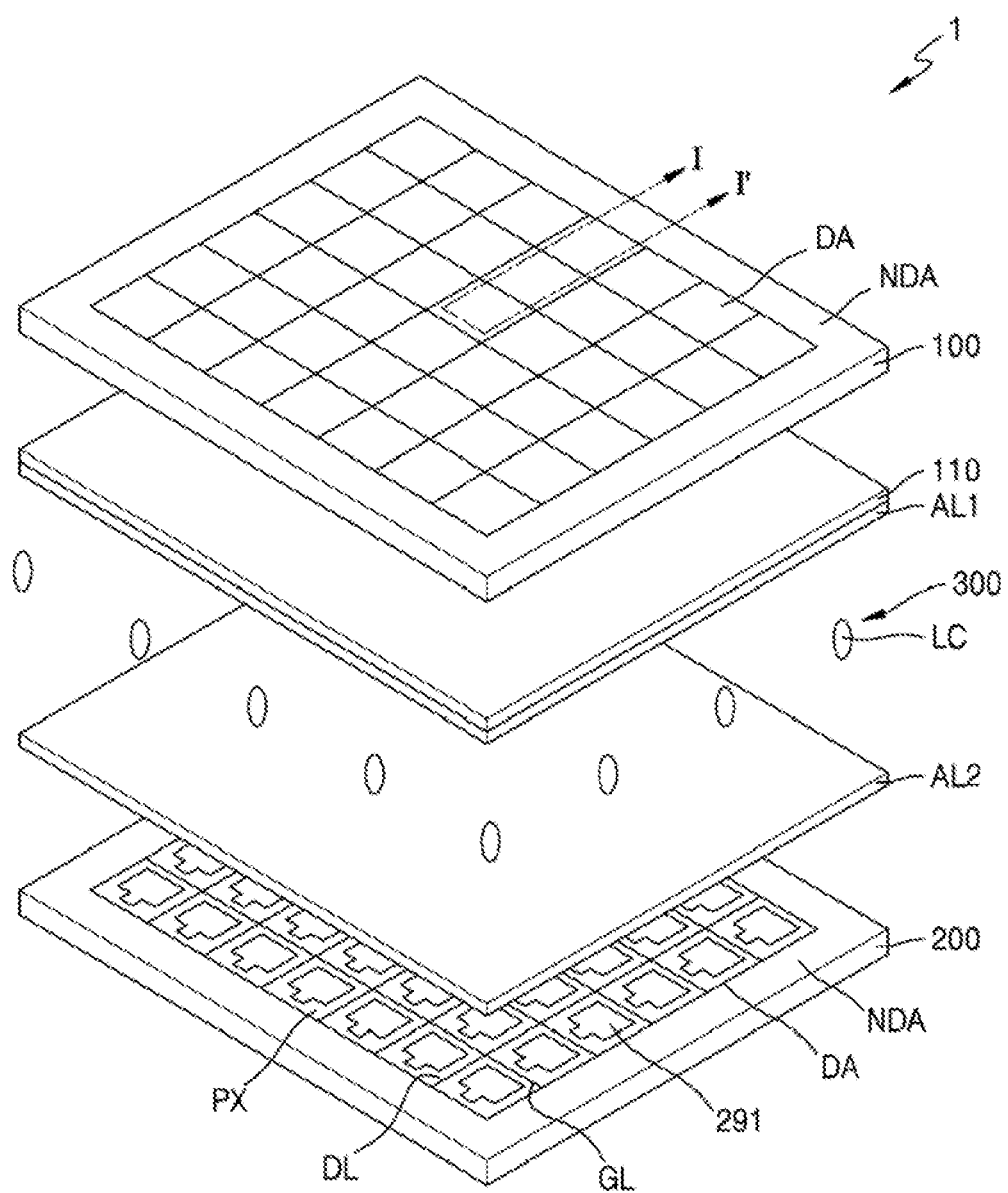
FIG. 1 is a schematic exploded perspective view of a liquid crystal display (LCD) apparatus according to an exemplary embodiment of the present inventive concept.

Since the drawings in FIGS. 1-4 are intended for illustrative purposes, the elements in the drawings are not necessarily drawn to scale. For example, some of the elements may be enlarged or exaggerated for clarity purpose.

DETAILED DESCRIPTION OF THE EMBODIMENTS

Reference will now be made in detail to exemplary embodiments of the present inventive concept, examples of which are illustrated in the accompanying drawings, wherein like reference numerals refer to like elements throughout. In this regard, the present inventive concept may have different forms and should not be construed as being limited to the descriptions set forth herein. Accordingly, the exemplary embodiments are merely described below, by referring to the figures, to explain aspects of the present inventive concept. As used herein, the term "and/or" includes any and all combinations of one or more of the associated listed items.

As the present inventive concept allows for various changes and numerous embodiments, particular exemplary embodiments will be illustrated in the drawings and described in detail in the written description. Effects, features, and a method of achieving the present inventive concept will be obvious by referring to exemplary embodiments of the present inventive concept with reference to the attached drawings. The present inventive concept may, however, be embodied in many different forms and should not be construed as being limited to the specific exemplary embodiments set forth herein.

Hereinafter, the present inventive concept will be described in detail by explaining exemplary embodiments of the present inventive concept with reference to the attached drawings. Like reference numerals in the drawings denote like elements, and thus repeated description thereof will be omitted.

In the exemplary embodiments described in the present specification, an expression used in the singular encompasses the expression of the plural, unless it has a clearly different meaning in the context.

In the present specification, it is to be understood that the terms such as "including", "having" and "comprising" are intended to indicate the existence of the features or components disclosed in the specification, and are not intended to preclude the possibility that one or more other features or components may exist or may be added.

It will be understood that when a layer, region, or component is referred to as being "on" or "onto" another layer, region, or component, it may be directly or indirectly formed over the other layer, region, or component. That is, for example, intervening layers, regions, or components may be present.

The present inventive concept will now be described more fully with reference to the accompanying drawings, in which exemplary embodiments of the present inventive concept are shown.

Figure 2:
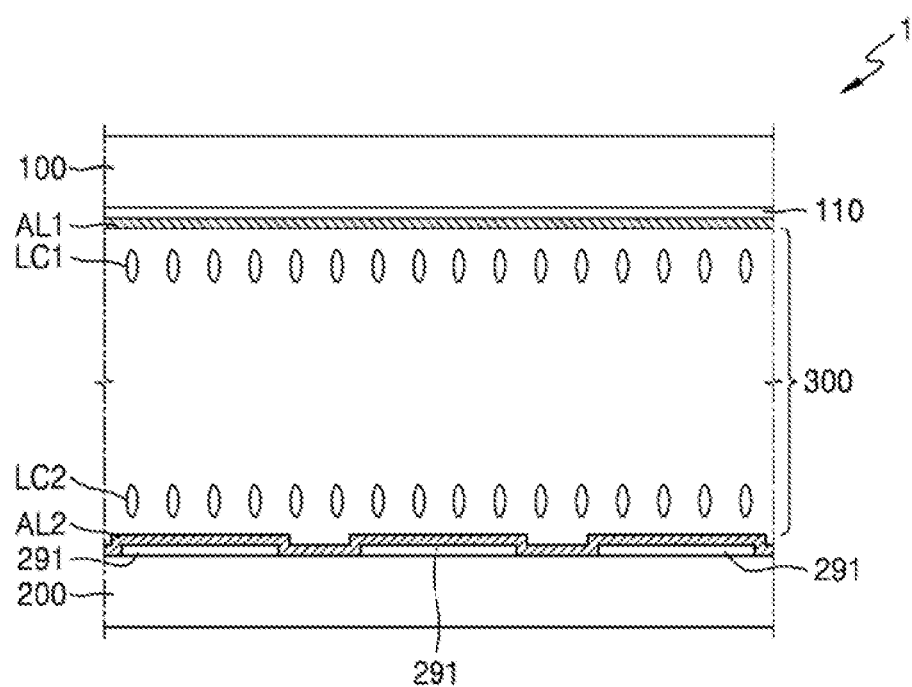
FIG. 2 is a schematic cross-sectional view taken alone line I-I' of FIG. 1.

FIG. 1 is a schematic exploded perspective view of a liquid crystal display apparatus 1 according to an exemplary embodiment of the present inventive concept. FIG. 2 is a schematic cross-sectional view taken along line I-I' of FIG. 1.

Referring to FIGS. 1 and 2, the liquid crystal display apparatus 1 may include a first substrate 100, a second substrate 200 facing the first substrate 100, a liquid crystal layer 300 disposed between the first substrate 100 and the second substrate 200, a first liquid crystal alignment layer AL1 disposed between the liquid crystal layer 300 and the first substrate 100, and a second liquid crystal alignment layer AL2 disposed between the liquid crystal layer 300 and the second substrate 200. Further, the first liquid crystal alignment layer AL1 may include a first ion adsorbing group, the second liquid crystal alignment layer AL2 may include a second ion adsorbing group, and i) a content of the first ion adsorbing group in the first liquid crystal alignment layer AU may be different from that of the second ion adsorbing group in the second liquid crystal alignment layer AL2; or ii) a chemical structure of the first ion adsorbing group may be different from that of the second ion adsorbing group. Here, the use of listing numbers "i)" and "ii)" is only for convenience of explanation, and these listing numbers are used to distinguish one item from another item. There is no indication that the item following the listing number i) has higher priority in sequence or importance than the item following the listing number ii). The first and second ion absorbing groups may adsorb ion impurities present in the liquid crystal layer 300 to reduce a drop of the applied voltage due to movement of ion impurities under an electric field.

The first substrate 100 and the second substrate 200 may each include a display area DA and a non-display area NDA. The display area DA is an area where an image is displayed, and the non-display area NDA is an area where an image is not displayed. The non-display area NDA may be disposed to surround the display area DA.

A common electrode 110 may be disposed between the first substrate 100 and the liquid crystal layer 300. The common electrode 110 may be a patternless electrode without a slit pattern. A pixel electrode 291 may be disposed between the second substrate 200 and the liquid crystal layer 300. The pixel electrode 291 may be a patterned electrode having a slit pattern.

The liquid crystal layer 300 may be disposed between the common electrode 110 and the pixel electrode 291. The liquid crystal layer 300 may include liquid crystal molecules LC having negative dielectric anisotropy. The liquid crystal molecules LC may have a rod like shape. A first liquid crystal alignment layer AL1 may be disposed between the common electrode 110 and the liquid crystal layer 300. A second liquid crystal alignment layer AL2 may be disposed between the pixel electrode 291 and the liquid crystal layer 300. The first liquid crystal alignment layer AL1 and the second liquid crystal alignment layer AL2 may each be prepared such that liquid crystal molecules LC are arranged at a given pretilt angle. That is, the liquid crystal molecules LC may have their alignment controlled by bonding with the first liquid crystal alignment layer AL1 and the second liquid crystal alignment layer AL2. When an electric field is not formed in the liquid crystal layer 300, the liquid crystal molecules LC may be aligned substantially perpendicularly to the surfaces of the first substrate 100 and the second substrate 200. The liquid crystal molecules LC may have a relatively small pretilt angle determined by the first liquid crystal alignment layer AL1 and the second liquid crystal alignment layer AL1.

The second substrate 200 may be a thin-film transistor (TFT) substrate. In the display area DA of the second substrate 200, a plurality of gate lines GL extending in a first direction and a plurality of data lines DL extending in a second direction perpendicular to the first direction may be formed. The pixel electrode 291 may be disposed in each of pixels PX defined by the gate lines GL and the data lines DL.

The pixel electrode 291 may include subpixel electrodes that are spaced apart from each other. For example, each of the subpixel electrodes may have a quadrilateral shape. Each of the subpixel electrodes may be a patterned electrode having a slit pattern. Specifically, the slit pattern may consist of a stem and slits disposed between branches extending from the stem. The stem may be shaped like a cross (+), and the branches may extend radially from the cross-shaped stem in a direction at an angle of approximately 45 degrees to the stem.

The gate lines GL may include gate electrodes which protrude from the gate lines GL in the second direction toward the pixel electrode 291. A plurality of data lines DL may include source electrodes and drain electrodes. The source electrodes may extend from the data lines DL in a "U" shape. The drain electrodes may be separated from the source electrodes.

The pixel electrode 291 may receive a data voltage through a TFT, which is a switching device. The gate electrodes which are control terminals of TFTs may be electrically connected to the gate lines GL, the source electrodes which are input terminals of the TFTs may be electrically connected to the data lines DL via contact holes, and the drain electrodes which are output terminals of the TFTs may be electrically connected to the pixel electrode 291.

The pixel electrode 291 may generate an electric field together with the common electrode 110, thereby controlling the alignment direction of the liquid crystal molecules LC of the liquid crystal layer 300 interposed therebetween. The pixel electrode 291 may control the alignment direction of first liquid crystal molecules LC1 and the alignment direction of second liquid crystal molecules LC2 by distorting the electric field. For example, when an electric field is applied to the liquid crystal layer 300, the alignment direction of the first liquid crystal molecules LC1 and the alignment direction of the second liquid crystal molecules LC2 may be changed according to the electric field by the interaction between the anisotropy of dielectric constant of the first and second liquid crystal molecules LC1 and LC2 composition(s) and the electric field.

The TFT substrate may include a stack of a base substrate which is made of glass or polymer, the gate electrodes, a gate insulating layer, a semiconductor layer, an ohmic contact layer, the source electrodes, the drain electrodes, a passivation layer, and an organic layer, etc.

A channel of a TFT may be formed of the semiconductor layer. The semiconductor layer may overlap the gate electrodes. The source electrodes may be separated from the drain electrodes with respect to the semiconductor layer, respectively.

A storage electrode line may include a stem line extending substantially parallel to the gate lines GL and a plurality of branch lines extending from the stem line. The storage electrode line may be omitted, and the shape and position of the storage electrode line may be variously changed.

The non-display area NDA may be a light-blocking area surrounding the display area DA. A driving unit which provides a gate driving signal, a data driving signal, etc. to each pixel PX of the display area DA may be disposed in the non-display area NDA of the second substrate 200. The gate lines GL and the data lines DL may extend from the display area DA to the non-display area NDA to be electrically connected to the driving unit.

The first substrate 100 may be a counter substrate of the second substrate 200. The common electrode 110 may be disposed on the first substrate 100 and located between the first liquid crystal alignment layer AU and the first substrate 100.

A color filter layer may be formed in an area corresponding to each pixel PX of the display area DA and may include a red color filter, a green color filter and a blue color filter. The color filter layer may be included in one of the first substrate 100 and the second substrate 200.

In a case where the first substrate 100 includes the color filter layer, the first substrate 100 may have a structure in which a base substrate made of glass or polymer, the color filter layer, and an overcoat layer are stacked. The overcoat layer may be a planarization layer which covers the color filter layer. In this case, the common electrode 110 may be disposed on the overcoat layer.

In a case where the second substrate 200 includes the color filter layer, the second substrate 200 may have a color filter-on-array (COA) structure in which color filters are formed on a transparent insulating substrate having TFTs. For example, the color filter layer may be disposed between the passivation layer and the organic layer, with the passivation layer covering the source electrodes and the drain electrodes.

A light-blocking pattern layer may be disposed at the boundary of each of the red color filter, the green color filter and the blue color filter. The light-blocking pattern layer may be included in one of the first substrate 100 and the second substrate 200. For example, the light-blocking pattern layer may be a black matrix.

The first liquid crystal alignment layer AL1 may include a first ion adsorbing group, the second liquid crystal alignment layer AL2 may include a second ion adsorbing group, and i) a content of the first ion adsorbing group in the first liquid crystal alignment layer AL1 may be different from that of the second ion adsorbing group in the second liquid crystal alignment layer AL2; or ii) a chemical structure of the first ion adsorbing group may be different from that of the second ion adsorbing group.

In an exemplary embodiment of the present inventive concept, i) a chemical structure of the first ion adsorbing group may be identical to that of the second ion adsorbing group, and a content of the first ion adsorbing group in the first liquid crystal alignment layer AL1 may be different from that of the second ion adsorbing group in the second liquid crystal alignment layer AL2; or ii) a chemical structure of the first ion adsorbing group may be different from that of the second ion adsorbing group, and a content of the first ion adsorbing group in the first liquid crystal alignment layer AU may be identical to that of the second ion adsorbing group in the second liquid crystal alignment layer AL2, but the present inventive concept is not limited thereto.

In an exemplary embodiment of the present inventive concept, a chemical structure of the first ion adsorbing group may be different from that of the second ion adsorbing group but ion absorbing reactivities of the first and second ion absorbing groups may be about the same, and a content of the first ion adsorbing group in the first liquid crystal alignment layer AL1 may be different from that of the second ion adsorbing group in the second liquid crystal alignment layer AL2.

In an exemplary embodiment of the present inventive concept, i) a chemical structure of the first ion adsorbing group may be identical to that of the second ion adsorbing group, and a content of the first ion adsorbing group in the first liquid crystal alignment layer AL1 may be greater than that of the second ion adsorbing group in the second liquid crystal alignment layer AL2; or ii) an ion adsorbing reactivity of the first ion adsorbing group may be higher than that of the second ion adsorbing group, and a content of the first ion adsorbing group in the first liquid crystal alignment layer AU may be identical to that of the second ion adsorbing group in the second liquid crystal alignment layer AL2, but the present inventive concept is not limited thereto.

By differing in the reactivity or the content of the first ion adsorbing group of the first liquid crystal alignment layer AL1 and the second ion adsorbing group of the second liquid crystal alignment layer AL2, an amount of ion impurities adsorbed by the first liquid crystal alignment layer AU on the first substrate 100 and that of ion impurities adsorbed by the second liquid crystal alignment layer AL2 on the second substrate 200 may be controlled to be equivalent to each other. For example, the amount of ion impurities of the liquid crystal molecules LC of the liquid crystal layer 300 near the first substrate 100 and the amount of ion impurities of the liquid crystal molecules LC of the liquid crystal layer 300 near the second substrate 200 may be properly controlled. Accordingly, a liquid crystal display apparatus may have less discoloration and an enhanced voltage holding ratio (VHR). In an exemplary embodiment of the present inventive concept, in a case where a reactivity of the first liquid crystal alignment layer AU is identical to that of the second liquid crystal alignment layer AL2, i.e., in the case of the same reactivity and content of ion adsorbing groups, discoloration may occur while deforming a substrate into a curved shape. In an exemplary embodiment of the present inventive concept, in a case where a reactivity of the first liquid crystal alignment layer AL1 is identical to that of the second liquid crystal alignment layer AL2, more discoloration may occur in a portion where a substrate is greatly curved. Thus, as described in an exemplary embodiment of the present inventive concept, by differing in the reactivity or the content of the first ion adsorbing group of the first liquid crystal alignment layer AL1 and the second ion adsorbing group of the second liquid crystal alignment layer AL2, discoloration of a liquid crystal display apparatus may be less or prevented.

In an exemplary embodiment of the present inventive concept, a chemical structure (or an ion absorbing reactivity) of the first ion adsorbing group may be different from that of the second ion adsorbing group, and a content of the first ion adsorbing group in the first liquid crystal alignment layer AL1 may also be different from that of the second ion adsorbing group in the second liquid crystal alignment layer AL2. That is, the first and second ion absorbing groups may be different from each other with respect to at least one of the chemical structure (or the ion absorbing reactivity) and the content described above, so that the adsorption of the ion impurities by the first and second liquid crystal alignment layers AL1 and AL2 may be properly controlled to reduce or prevent discoloration of a liquid crystal display apparatus due to a curved substrate.

A content of the first ion adsorbing group may be about 10 percent by weight (wt %) or greater and about 60 wt % or less in the first liquid crystal alignment layer AL1. When a content of the first ion adsorbing group is less than 10 wt %, ion impurities on the first substrate 100 may not be reduced or may not be sufficiently reduced, and thus an afterimage may be generated. For example, majority of ion impurities may remain in the liquid crystal molecules LC of the liquid crystal layer 300 near the first substrate 100. When a content of the first ion adsorbing group is greater than 60 wt %, polymerization of reactive mesogen may be excessively suppressed in the preparation of the first liquid crystal alignment layer AL1, and thus a portion of the first liquid crystal alignment layer AL1 may not be formed. In an exemplary embodiment of the present inventive concept, a content of the first ion adsorbing group may be about 10 wt % or greater and about 30 wt % or less in the first liquid crystal alignment layer AL1, but the present inventive concept is not limited thereto.

A content of the second ion adsorbing group may be about 10 wt % or greater and about 30 wt % or less in the second liquid crystal alignment layer AL2. When a content of the second ion adsorbing group is less than 10 wt %, ion impurities on the second substrate 200 may not be reduced or may not be sufficiently reduced, and thus an afterimage may be generated. For example, majority of ion impurities may remain in the liquid crystal molecules LC of the liquid crystal layer 300 near the second substrate 200. When a content of the second ion adsorbing group is greater than 30 wt %, polymerization of reactive mesogen may be excessively suppressed in the preparation of the second liquid crystal alignment layer AL2, and thus a portion of the second liquid crystal alignment layer AL2 may not be formed.

In an exemplary embodiment of the present inventive concept, a content of the first ion adsorbing group in the first liquid crystal alignment layer AL1 may be greater than that of the second ion adsorbing group in the second liquid crystal alignment layer AL2. Accordingly, an amount of ion impurities adsorbed by the first liquid crystal alignment layer AL1 on the first substrate 100 and that of ion impurities adsorbed by the second liquid crystal alignment layer AL2 on the second substrate 200 may be properly controlled.

The first ion adsorbing group and the second ion adsorbing group may each be represented by Formula 1, but the present inventive concept is not limited thereto:

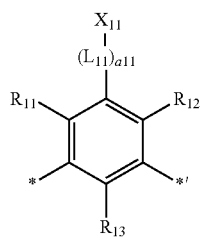

Formula 1 in Formula 1, $X_{11}$ may be a substituted or unsubstituted $C_1$-$C_{60}$ heterocyclic group, $L_{11}$ may be selected from *—$\{C(R_{14})(R_{15})\}_{n11}$—O—$\{C(R_{16})(R_{17})\}_{n12}$—*', *—$\{C(R_{14})(R_{15})\}_{n11}$—C(=O)O—$\{C(R_{16})(R_{17})\}_{n12}$—*', and *—$\{C(R_{14})(R_{15})\}_{n11}$—OC(=O)—$\{C(R_{16})(R_{17})\}_{n12}$—*', n11 and n12 may each independently be selected from 0, 1, 2, and 3, a11 may be selected from 0, 1, 2, and 3, $R_{11}$ to $R_{17}$ may each independently be selected from hydrogen, deuterium, —F, —Cl, —Br, —I, a hydroxyl group, a cyano group, a nitro group, a substituted or unsubstituted $C_1$-$C_{20}$ alkyl group, a substituted or unsubstituted $C_1$-$C_{20}$ alkoxy group, a substituted or unsubstituted $C_5$-$C_{60}$ carbocyclic group, and a substituted or unsubstituted $C_1$-$C_{60}$ heterocyclic group, and

* and *' may each indicate a binding site to an adjacent atom.

In an exemplary embodiment of the present inventive concept, in Formula 1, $X_{11}$ may be selected from a dioxane group, a dioxanone group, a tetrahydropyridazine group, a furan group, a pyrrole group, an oxazole group, a pyridine group, a pyrimidine group, a pyridazine group, and a triazine group; and a dioxane group, a dioxanone group, a tetrahydropyridazine group, a furan group, a pyrrole group, an oxazole group, a pyridine group, a pyrimidine group, a pyridazine group, and a triazine group, each substituted with at least one selected from deuterium, —F, —Cl, —Br, —I, a $C_1$-$C_{20}$ alkyl group, and a $C_1$-$C_{20}$ alkoxy group, but the present inventive concept is not limited thereto.

In an exemplary embodiment of the present inventive concept, in Formula 1, $L_{11}$ may be selected from *—$\{CH_2\}_{n11}$—C(=O)O—$\{CH_2\}_{n12}$—*' and *—$\{CH_2\}_{n11}$—OC(=O)—$\{CH_2\}_{n12}$—*', n11 and n12 may be each independently selected from 0, 1, and 2, a11 may be 1, and

* and *' may each independently indicate a binding site to an adjacent atom, but the present inventive concept is not limited thereto.

In an exemplary embodiment of the present inventive concept, in Formula 1, $R_{11}$ to $R_{13}$ may each be hydrogen, but the present inventive concept is not limited thereto.

In an exemplary embodiment of the present inventive concept, the first ion adsorbing group and the second ion adsorbing group may each be represented by one of Formulae 1-1 to 1-16, but the present inventive concept is not limited thereto:

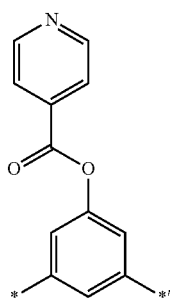

1-1

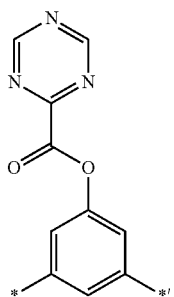

1-2

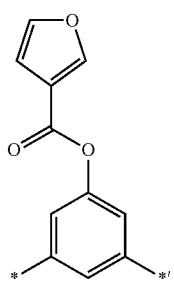

1-3

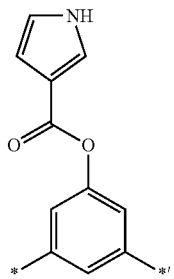

1-4

1-5 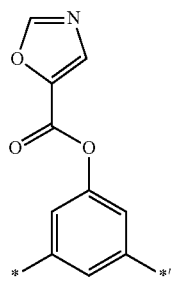
1-6 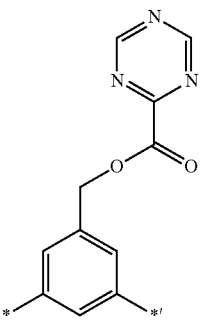
1-7 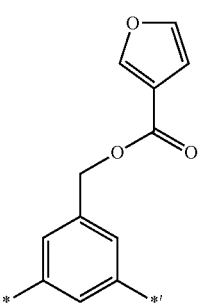
1-8 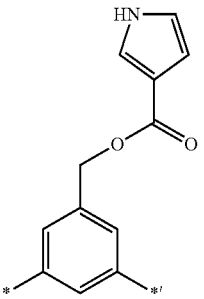
1-9 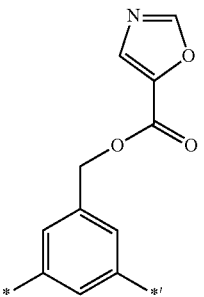
1-10 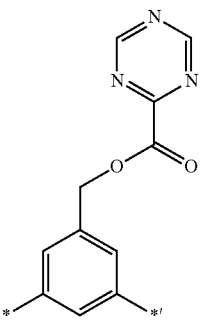
1-11 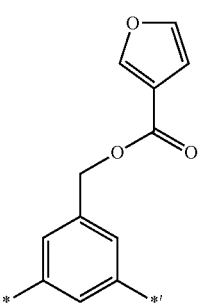
1-12 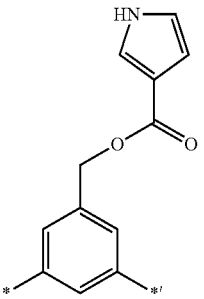
1-13 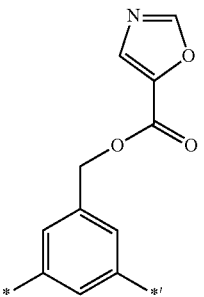
1-14 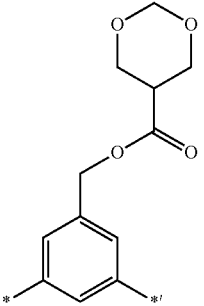

-continued

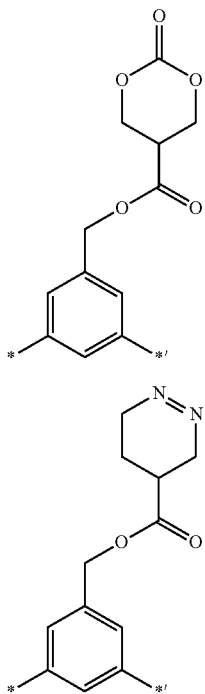

1-15

1-16 in Formulae 1-1 to 1-16,

* and *' may each indicate a binding site to an adjacent atom.

In an exemplary embodiment of the present inventive concept, the first ion adsorbing group may be represented by one of Formulae 1-1 to 1-4 and 1-9 to 1-12, and the second ion adsorbing group may be represented by one of Formulae 1-5 to 1-8 and 1-13 to 1-16, but the present inventive concept is not limited thereto. Accordingly, an amount of ion impurities adsorbed by the first liquid crystal alignment layer AL1 on the first substrate 100 and that of ion impurities adsorbing by the second liquid crystal alignment layer AL2 on the second substrate 200 may be properly controlled.

In an exemplary embodiment of the present inventive concept, the first liquid crystal alignment layer AL1 may not include a polymerization initiating group, and the second liquid crystal alignment layer AL2 may further include a polymerization initiating group, but the present inventive concept is not limited thereto. In an exemplary embodiment of the present inventive concept, a content of the polymerization initiating group in the first liquid crystal alignment layer AL1 and that of the polymerization initiating group in the second liquid crystal alignment layer AL2 may each independently be about 10 wt % or greater and about 30 wt % or less.

By including the polymerization initiating group in the second liquid crystal alignment layer AL2, a radical polymerization reaction of mesogen described herein may be promoted, and the second liquid crystal molecules LC2 on the second liquid crystal alignment layer AL2 may be arranged to form a predetermined line inclination on a surface of the second liquid crystal alignment layer AL2.

As the first liquid crystal alignment layer AL1 does not include a polymerization initiating group, a radical polymerization reaction of mesogen described herein may be suppressed or not promoted, and the first liquid crystal molecules LC1 on the first liquid crystal alignment layer AL1 may substantially fail to form a line inclination on a surface of the first liquid crystal alignment layer AL1, and/or the first liquid crystal molecules LC1 may be arranged in a direction perpendicular to the first liquid crystal alignment layer AL1.

As the reasons described above, a mesogen content of the first liquid crystal alignment layer AL1 may be different from that of the second liquid crystal alignment layer AL2. In an exemplary embodiment of the present inventive concept, a mesogen content of the first liquid crystal alignment layer AL1 may be smaller than that of the second liquid crystal alignment layer AL2.

The polymerization initiating group may be represented by Formula 2:

Formula 2

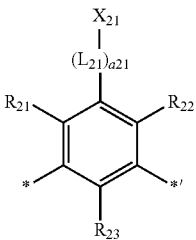

3-1

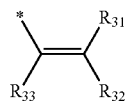

3-2

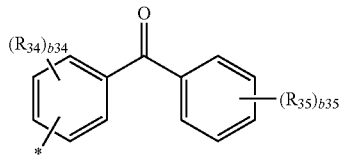

3-3

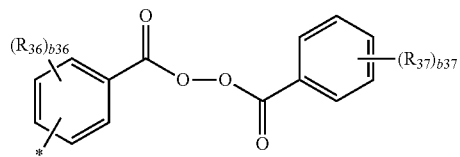

in Formulae 2 and 3-1 to 3-3, $X_{21}$ may be represented by one of Formulae 3-1 to 3-3, $L_{21}$ may be selected from *—$\{C(R_{24})(R_{25})\}_{n21}$—O—$\{C(R_{26})(R_{27})\}_{n22}$—*', *—$\{C(R_{24})(R_{25})\}_{n21}$—C(=O)O—$\{C(R_{26})(R_{27})\}_{n22}$—*', and *—$\{C(R_{24})(R_{25})\}_{n21}$—OC(=O)—$\{C(R_{26})(R_{27})\}_{n22}$—*', n21 and n22 may each independently be selected from 0, 1, 2, and 3, a21 may be selected from 0, 1, 2, and 3, $R_{21}$ to $R_{27}$ and $R_{31}$ to $R_{37}$ may each independently be selected from hydrogen, deuterium, —F, —Cl, —Br, —I, a hydroxyl group, a cyano group, a nitro group, a substituted or unsubstituted $C_1$-$C_{20}$ alkyl group, a substituted or unsubstituted $C_1$-$C_{20}$ alkoxy group, a substituted or unsubstituted $C_5$-$C_{60}$ carbocyclic group, and a substituted or unsubstituted $C_1$-$C_{60}$ heterocyclic group, b34 and b36 may each independently be selected from 1, 2, 3, and 4, b35 and b37 may each independently be selected from 1, 2, 3, 4, and 5, and \* and \*' may each indicate a binding site to an adjacent atom.

For example, in Formula 2, $L_{21}$ may be selected from *—{CH$_2$}$_{n21}$—C(=O)O-{CH$_2$}$_{n22}$—*' and *—{CH$_2$}$_{n21}$—OC(=O)—{CH$_2$}$_{n22}$—*', n21 and n22 may each independently be selected from 0, 1, and 2, a21 may be 1, and \* and \*' may each independently indicate a binding site to an adjacent atom, but the present inventive concept is not limited thereto.

In an exemplary embodiment of the present inventive concept, in Formula 2, $R_{21}$ to $R_{23}$ may each be hydrogen, but the present inventive concept is not limited thereto.

In an exemplary embodiment of the present inventive concept, in Formulae 3-1 to 3-3, $R_{31}$ to $R_{37}$ may each independently be selected from hydrogen and a methyl group, but the present inventive concept is not limited thereto.

In an exemplary embodiment of the present inventive concept, the polymerization initiating group may be represented by at least one selected from Formulae 2-1 to 2-6, but the present inventive concept is not limited thereto:

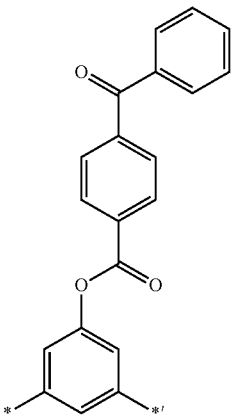

in Formulae 2-1 to 2-6,

\* and \*' may each indicate a binding site to an adjacent atom.

In an exemplary embodiment of the present inventive concept, the first liquid crystal alignment layer AL1 may further include a vertical alignment group. A vertical alignment group may allow the first liquid crystal molecules LC1 on the first liquid crystal alignment layer AL1 to be arranged in a direction perpendicular to the first liquid crystal alignment layer AL1.

A content of the vertical alignment group in the first liquid crystal alignment layer AL1 and that of the vertical alignment group in the second liquid crystal alignment layer AL2 may each independently be about 40 wt % or greater and about 60 wt % or less.

The vertical alignment group may be represented by Formula 4:

Formula 4

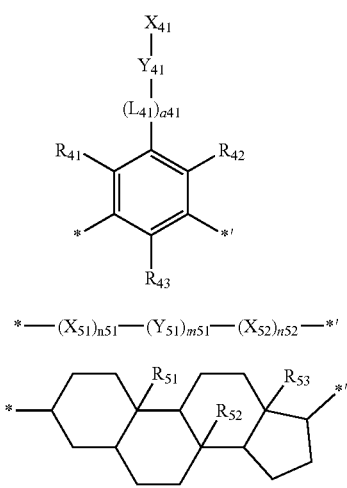

*—(X$_{51}$)$_{n51}$—(Y$_{51}$)$_{m51}$—(X$_{52}$)$_{n52}$—*'  5-1

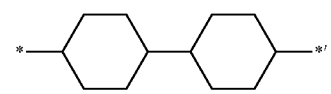 5-2 in Formulae 4, 5-1, and 5-2,

X$_{41}$ may be selected from substituted or unsubstituted C$_3$-C$_{20}$ linear alkyl groups, Y$_{41}$ may be represented by one of Formulae 5-1 and 5-2, L$_{41}$ may be selected from *—{C(R$_{44}$)(R$_{45}$)}$_{n41}$—O—{C(R$_{46}$)(R$_{47}$)}$_{n42}$—*', *—{C(R$_{44}$)(R$_{45}$)}$_{n41}$—C(=O)O—{C(R$_{46}$)(R$_{47}$)}$_{n42}$—*', and *—{C(R$_{44}$)(R$_{45}$)}$_{n41}$—OC(=O)—{C(R$_{46}$)(R$_{47}$)}$_{n42}$—*', n41 and n42 may each independently be selected from 0, 1, 2, and 3, a41 may be selected from 0, 1, 2, and 3, X$_{51}$ and X$_{52}$ may each be oxygen, n51 and n52 may each independently be selected from 0 and 1, Y$_{51}$ may be selected from a substituted or unsubstituted benzene group, a substituted or unsubstituted cyclohexane group, and a combination thereof, m51 may be selected from 1, 2, 3, and 4, R$_{41}$ to R$_{47}$ and R$_{51}$ to R$_{53}$ may each independently be selected from hydrogen, deuterium, —F, —Cl, —Br, —I, a hydroxyl group, a cyano group, a nitro group, a substituted or unsubstituted C$_1$-C$_{20}$ alkyl group, a substituted or unsubstituted C$_1$-C$_{20}$ alkoxy group, a substituted or unsubstituted C$_5$-C$_{60}$ carbocyclic group, and a substituted or unsubstituted C$_1$-C$_{60}$ heterocyclic group, and

* and *' may each indicate a binding site to an adjacent atom.

In an exemplary embodiment of the present inventive concept, in Formula 4, Y$_{41}$ may be represented by one of Formulae 5-11 to 5-17, but the present inventive concept is not limited thereto:

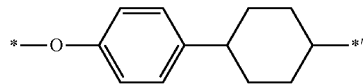 5-11

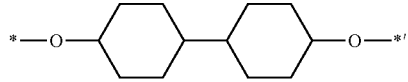 5-12

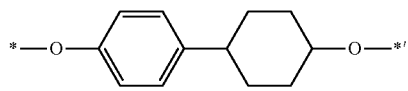 5-13

 5-14

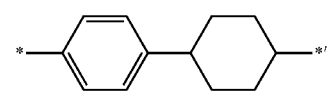 5-15

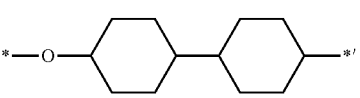 5-16

5-17 in Formulae 5-11 to 5-17,

* and *' may each indicate a binding site to an adjacent atom.

In an exemplary embodiment of the present inventive concept, the vertical alignment group may be represented by at least one selected from Formulae 4-1 to 4-4, but the present inventive concept is not limited thereto:

4-1

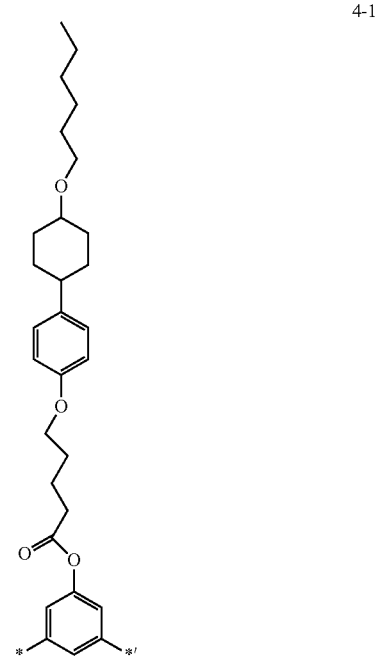

4-2

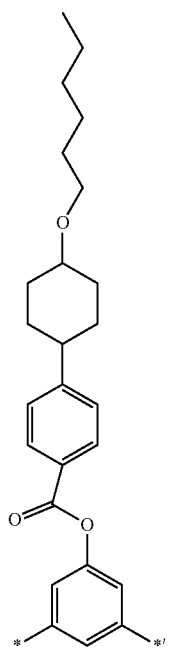

4-3

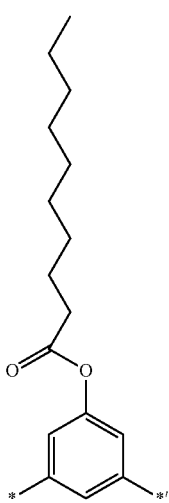

4-4

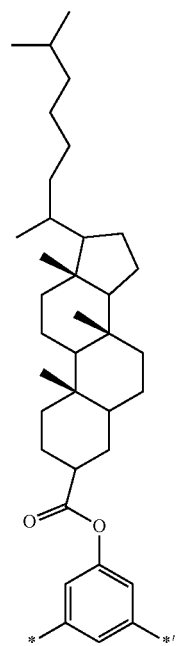

in Formulae 4-1 to 4-4,

* and *' may each indicate a binding site to an adjacent atom.

The first liquid crystal alignment layer AL1 and the second liquid crystal alignment layer AL2 may each include an imide repeating unit. Thus, the first ion adsorbing group, the second ion adsorbing group, the polymerization initiating group, and/or the vertical alignment group may be introduced into a side chain of polyimide. For the first liquid crystal alignment layer AL1 and the second liquid crystal alignment layer AL2 including polyimide, the alignment may be controlled by rubbing treatment, but the present inventive concept is not limited thereto.

The imide repeating unit may be represented by Formula 8:

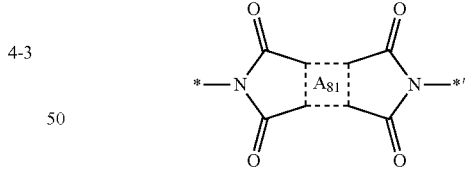

Formula 8 in Formula 8, $A_{81}$ may be selected from a substituted or unsubstituted $C_5$-$C_{60}$ carbocyclic group and a substituted or unsubstituted $C_1$-$C_{60}$ heterocyclic group, and

* and *' may each indicate a binding site to an adjacent atom.

In addition to the first and second ion absorbing groups, the polyimide may also adsorb ion impurities present in the liquid crystal layer 300 to help in reducing a drop of the applied voltage due to movement of impurity ions under electric field.

At least a portion of the first substrate 100 and at least a portion of the second substrate 200 may include a curved shape.

Hereinafter, a method of manufacturing a liquid crystal display apparatus according to an exemplary embodiment of the present inventive concept will be described. A method of manufacturing a liquid crystal display apparatus according to an exemplary embodiment of the present inventive concept includes preparing a first substrate including a first preliminary liquid crystal alignment layer on a surface and a second substrate including a second preliminary liquid crystal alignment layer on another surface; converting the second preliminary liquid crystal alignment layer into a second liquid crystal alignment layer; forming a liquid crystal layer between the first preliminary liquid crystal alignment layer and the second liquid crystal alignment layer; and converting the first preliminary liquid crystal alignment layer into a first liquid crystal alignment layer.

The first preliminary liquid crystal alignment layer may be formed by applying a composition for a first liquid crystal alignment layer including a first ion adsorbing group on the first substrate, followed by polymerization. Likewise, the second preliminary liquid crystal alignment layer may be formed by applying a composition for a second liquid crystal alignment layer including a second ion adsorbing group on the second substrate, followed by polymerization. The compositions for a first liquid crystal alignment layer and the composition for a second liquid crystal alignment layer may each include a solvent, e.g., N-methylpyrrolidone, butyl cellosolve, or γ-butyrolactone. The polymerization may be, for example, thermal polymerization. Alternatively, the polymerization may be photopolymerization.

The converting of the second preliminary liquid crystal alignment layer into a second liquid crystal alignment layer and the converting of the first preliminary liquid crystal alignment layer into a first liquid crystal alignment layer may each be performed by exposure to an electromagnetic field. For example, the exposure to an electromagnetic field may be performed, at a wavelength of 365 nm, by irradiating light having an illumination intensity in a range from about 10 milliwatts per square centimeter ($mW/cm^2$) to about 100 $mW/cm^2$ or by irradiating ultraviolet rays having an energy of 1 Joule (J) or more, but the present inventive concept is not limited thereto.

The forming of the liquid crystal layer may be performed by injecting a liquid crystal composition into a space between the first preliminary liquid crystal alignment layer and the second liquid crystal alignment layer, followed by heat treatment. Here, by the heat treatment, reactive mesogen in the first preliminary liquid crystal alignment layer may be eluted as a liquid crystal layer.

Figure 3:
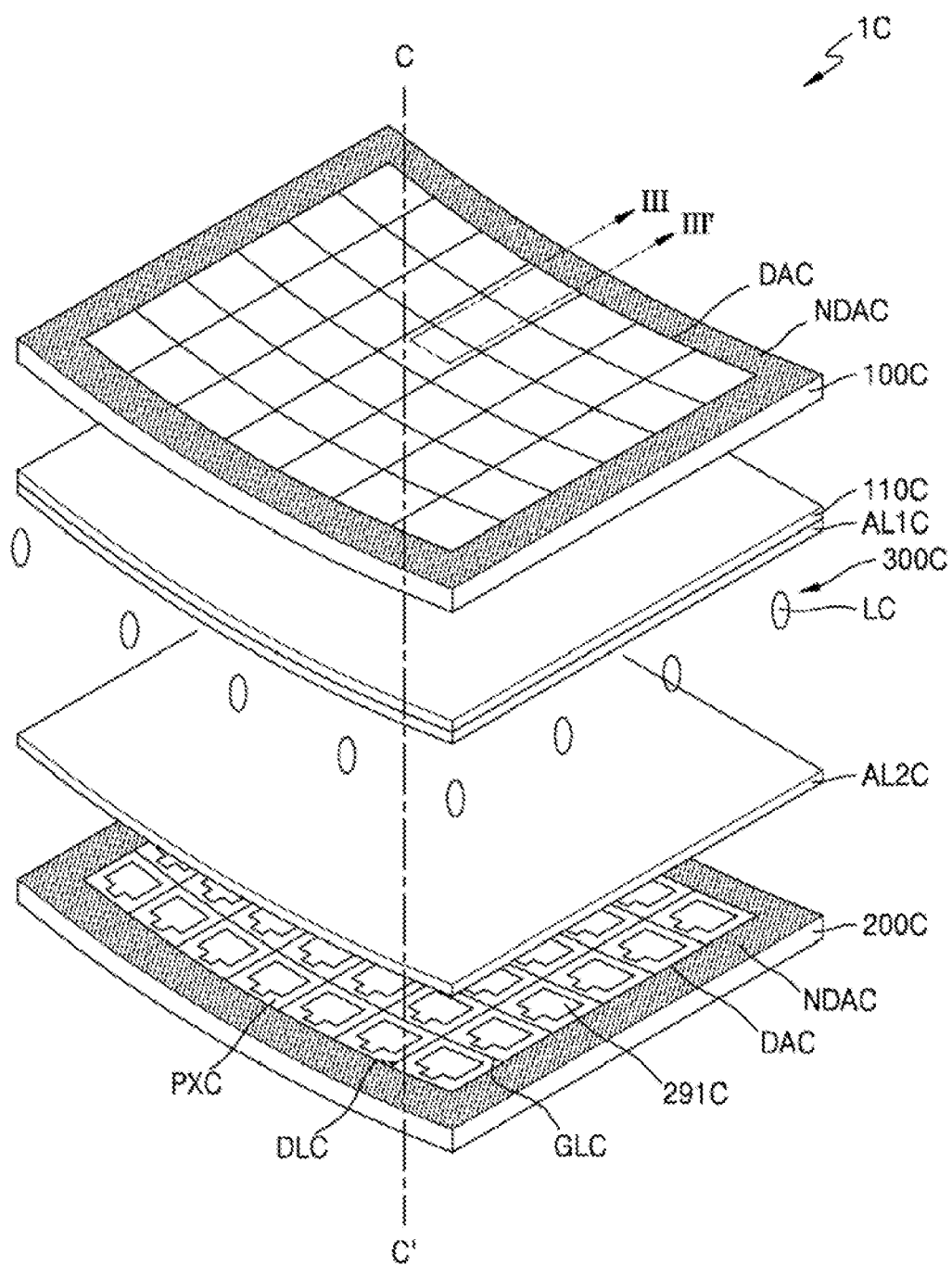
FIG. 3 is a schematic exploded perspective view of a liquid crystal display apparatus according to an exemplary embodiment of the present inventive concept.
Figure 4:
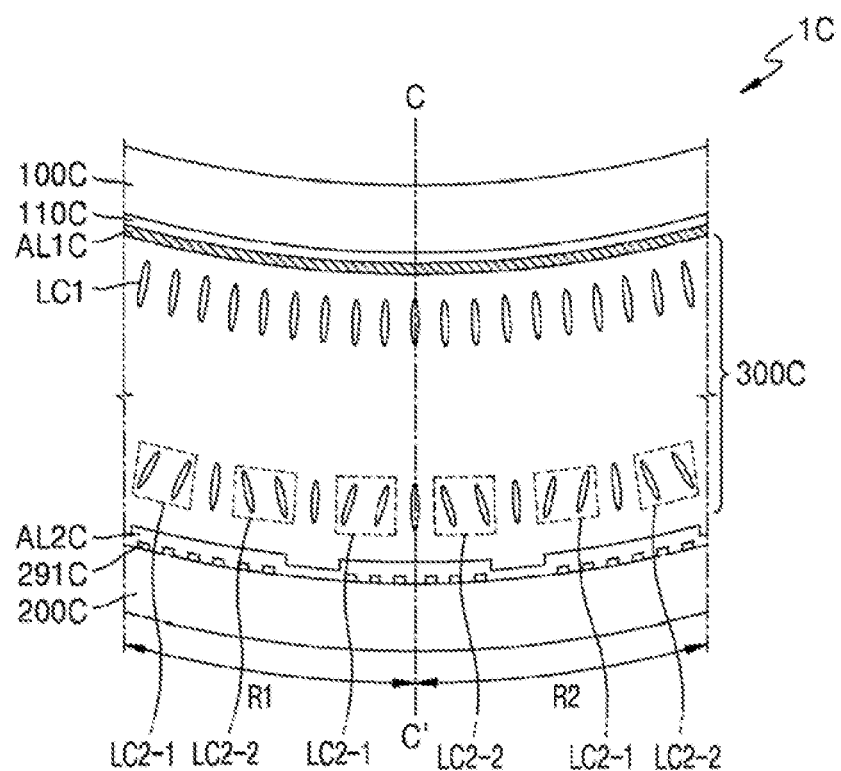
FIG. 4 is a schematic cross-sectional view taken along line III-III' of FIG. 3.

FIG. 3 is a schematic exploded perspective view of a curved liquid crystal display apparatus 1C according to an exemplary embodiment of the present inventive concept. FIG. 4 is a schematic cross-sectional view taken along line III-III' of FIG. 3. Referring to FIGS. 3 and 4, a structure of the curved liquid crystal display apparatus 1C according to an exemplary embodiment of the present inventive concept will be described in detail. In particular, the difference between the curved liquid crystal display apparatus 1C and the liquid crystal display apparatus 1 will be mainly described. The first ion adsorbing group, the second ion adsorbing group, the polymerization initiating group, and the vertical alignment group may be the same as those described above.

Referring to FIGS. 3 and 4, the curved liquid crystal display apparatus 1C may include a first curved substrate 100C, a second curved substrate 200C facing the first curved substrate 100C, a liquid crystal layer 300C disposed between the first curved substrate 100C and the second curved substrate 200C, a first liquid crystal alignment layer AL1C disposed between the liquid crystal layer 300C and the first curved substrate 100C, and a second liquid crystal alignment layer AL2C disposed between the liquid crystal layer 300C and the second curved substrate 200C. Further, the first liquid crystal alignment layer AL1C may include a first ion adsorbing group, the second liquid crystal alignment layer AL2C may include a second ion adsorbing group, and i) a content of the first ion adsorbing group in the first liquid crystal alignment layer AL1C may be different from that of the second ion adsorbing group in the second liquid crystal alignment layer AL2C; or ii) a chemical structure of the first ion adsorbing group may be different from that of the second ion adsorbing group.

In an exemplary embodiment of the present inventive concept, i) a chemical structure of the first ion adsorbing group may be identical to that of the second ion adsorbing group, and a content of the first ion adsorbing group in the first liquid crystal alignment layer AL1C may be different from that of the second ion adsorbing group in the second liquid crystal alignment layer AL2C; or ii) a chemical structure of the first ion adsorbing group may be different from that of the second ion adsorbing group, and a content of the first ion adsorbing group in the first liquid crystal alignment layer AL1C may be identical to that of the second ion adsorbing group in the second liquid crystal alignment layer AL2C, but the present inventive concept is not limited thereto.

In an exemplary embodiment of the present inventive concept, a chemical structure of the first ion adsorbing group may be different from that of the second ion adsorbing group but ion absorbing reactivities of the first and second ion absorbing groups may be about the same, and a content of the first ion adsorbing group in the first liquid crystal alignment layer AL1C may be different from that of the second ion adsorbing group in the second liquid crystal alignment layer AL2C.

In an exemplary embodiment of the present inventive concept, i) a chemical structure of the first ion adsorbing group may be identical to that of the second ion adsorbing group, and a content of the first ion adsorbing group in the first liquid crystal alignment layer AL1C may be greater than that of the second ion adsorbing group in the second liquid crystal alignment layer AL2C; or ii) an ion adsorbing reactivity of the first ion adsorbing group may be higher than that of the second ion adsorbing group, and a content of the first ion adsorbing group in the first liquid crystal alignment layer AL1C may be identical to that of the second ion adsorbing group in the second liquid crystal alignment layer AL2C, but the present inventive concept is not limited thereto.

In an exemplary embodiment of the present inventive concept, a chemical structure (or an ion absorbing reactivity) of the first ion adsorbing group may be different from that of the second ion adsorbing group, and a content of the first ion adsorbing group in the first liquid crystal alignment layer AL1C may also be different from that of the second ion adsorbing group in the second liquid crystal alignment layer AL2C. That is, the first and second ion absorbing groups may be different from each other with respect to at least one of the chemical structure (or the ion absorbing reactivity) and the content described above, so that the adsorption of the ion impurities by the first and second liquid crystal alignment layer AL1C and AL2C may be properly controlled to reduce or prevent discoloration of a liquid crystal display apparatus due to a curved substrate.

Upon manufacture of the curved liquid crystal display apparatus 1C, while bending a flat panel liquid crystal display apparatus, due to the difference in applied stress between first and second flat panel substrates, misalignment may occur, which is a difference in a pretilt angle of liquid crystal molecules in the upper and lower parts of a domain. For example, while bending a flat panel liquid crystal display apparatus, the first curved substrate 100C may be shifted to the left or right with respect to the second curved substrate 200C. In this case, the arrangement of the first curved substrate 100C and the second curved substrate 200C may become different from the originally designed arrangement of first and second flat substrates. Such misalignment between the first curved substrate 100C and the second curved substrate 200C may deteriorate the display quality of the curved liquid crystal display apparatus 1C.

When the first liquid crystal alignment layer AL1C and the second liquid crystal alignment layer AL2C each includes a few domains in which alignment directions of directors of liquid crystal molecules are various, the misalignment at a boundary of domains of the first liquid crystal alignment layer AL1C and a boundary of domains of the second liquid crystal alignment layer AL2C may be aligned in a direction different from that of the first liquid crystal molecules that are inclinedly aligned with respect to a surface of the first liquid crystal alignment layer AL1C, and interference or collision of the alignment direction between the second liquid crystal molecules that are inclinedly aligned with respect to a surface of the second liquid crystal alignment layer AL2C may occur. Accordingly, liquid crystal molecules between the first and second liquid crystal molecules may be substantially vertically aligned, thus forming a texture. The texture may be displayed as a stain or a dark space in a display area DAC of the curved liquid crystal display apparatus 1C. Thus, the light transmittance of the curved liquid crystal display apparatus 1C may deteriorate.

Referring to FIG. 4, the first liquid crystal molecules LC1 may be aligned on a surface of the first liquid crystal alignment layer AL1C. The second liquid crystal molecules LC2-1 and LC2-2 may be aligned on the second liquid crystal alignment layer AL2C. The first liquid crystal molecules LC1 may be relatively vertically aligned, as compared with the second liquid crystal molecules LC2-1 and LC2-2. That is, the second liquid crystal molecules LC2-1 and LC2-2 may be relatively inclinedly aligned, as compared with the first liquid crystal molecules LC1.

The second liquid crystal molecules LC2-1 and LC2-2 may be arranged to form a predetermined line inclination on a surface of the second liquid crystal alignment layer AL2C, and the first liquid crystal molecules LC1 may fail to form a line inclination, or may be arranged in substantially vertical alignment (little line inclination), different from the second liquid crystal molecules LC2-1 and LC2-2. Accordingly, even when misalignment occurs while bending the first curved substrate 100C and the second curved substrate 200C, interference or collision of the alignment direction and formation of a texture described above may be prevented. Therefore, a stain or a dark space in the display area DAC of the curved liquid crystal display apparatus 1C may not be displayed, and deterioration of the light transmittance thereof may be prevented.

In an exemplary embodiment of the present inventive concept, in an initial state in which an electric field is not applied to the curved liquid crystal display apparatus 1C, the second liquid crystal alignment layer AL2C may form at least two domains having different alignment directions of the second liquid crystal molecules LC2-1 and LC2-2 in each of a first region R1 and a second region R2. On the other hand, the first liquid crystal alignment layer AL1C may form a domain having substantially the same alignment direction of the first liquid crystal molecules LC1 in each of the first region R1 and the second region R2.

Here, the first region R1 and the second region R2 each indicate a left portion and right portion, respectively, with respect to a virtual straight line C-C' through a peak of the first curved substrate 100C and a peak of the second curved substrate 200C. A peak is a point on a curve at which a slope of a tangent is substantially zero.

Referring to FIG. 4, regarding the second liquid crystal alignment layer AL2C, the second liquid crystal molecules LC2-1 may be aligned in a first inclined direction, and the second liquid crystal molecules LC2-2 may be aligned in a second inclined direction in the first region R1. The second liquid crystal alignment layer AL2C may form at least two domains, in which an alignment direction of the second liquid crystal molecules LC2-1 differs from that of the second liquid crystal molecules LC2-2, in the first region R1. The first inclined direction may be tilted at about $-\alpha°$ with respect to the virtual straight line C-C'. The second inclined direction may be tilted at about $+\alpha°$ with respect to the virtual straight line C-C'. Here, a is a real positive value.

Regarding the second liquid crystal alignment layer AL2C, the second liquid crystal molecules LC2-1 may be aligned in a first inclined direction, and the second liquid crystal molecules LC2-2 may be aligned in a second inclined direction in the second region R2. The second liquid crystal alignment layer AL2C may form at least two domains, in which an alignment direction of the second liquid crystal molecules LC2-1 differs from that of the second liquid crystal molecules LC2-2, in the second region R2.

The first liquid crystal alignment layer AL1C may form a domain in which the first liquid crystal molecules LC1 may be aligned in a third inclined direction in the first region R1, and form a domain in which the first liquid crystal molecules LC1 may be aligned in a fourth inclined direction in the second region R2. For example, the third inclined direction may be tilted at about $-\beta°$ with respect to the virtual straight line C-C'. The fourth inclined direction may be tilted at about $+\beta°$ with respect to the virtual straight line C-C'. Here, $\beta$ is a real positive value.

As such, in each of the first region R1 and the second region R2, by optionally forming a few domains having different alignment directions of the liquid crystal molecules in the second liquid crystal alignment layer AL2C only from among the first liquid crystal alignment layer AL1C and the second liquid crystal alignment layer AL2C, display of a stain or a dark space caused by collision of alignment directions of the first liquid crystal molecules LC1 and the second liquid crystal molecules LC2-1 and LC2-2 may be prevented.

Hereinafter, a method of manufacturing a liquid crystal display apparatus according to an exemplary embodiment of the present inventive concept will be described. A method of manufacturing a liquid crystal display apparatus according to an exemplary embodiment of the present inventive concept includes preparing a first substrate including a first preliminary liquid crystal alignment layer on a surface and a second substrate including a second preliminary liquid crystal alignment layer on another surface; converting the second preliminary liquid crystal alignment layer into a second liquid crystal alignment layer; forming a liquid crystal layer between the first preliminary liquid crystal alignment layer and the second liquid crystal alignment layer; converting the first preliminary liquid crystal alignment layer into a first liquid crystal alignment layer; and bending the first substrate and the second substrate to form a curved shape.

The first preliminary liquid crystal alignment layer may be formed by applying a composition for a first liquid crystal alignment layer including a first ion adsorbing group on the first substrate, followed by polymerization. Likewise, the second preliminary liquid crystal alignment layer may be formed by applying a composition for a second liquid crystal alignment layer including a second ion adsorbing group on the second substrate, followed by polymerization. The composition for a first liquid crystal alignment layer and the composition for a second liquid crystal alignment layer may each include a solvent, e.g., N-methylpyrrolidone, butyl cellosolve, or γ-butyrolactone. The polymerization may be, for example, thermal polymerization. Alternatively, the polymerization may be photopolymerization.

The converting of the second preliminary liquid crystal alignment layer into a second liquid crystal alignment layer and the converting of the first preliminary liquid crystal alignment layer into a first liquid crystal alignment layer may each be performed by exposure to an electromagnetic field. For example, the exposure to an electromagnetic field may be performed, at a wavelength of 365 nm, by irradiating light having an illumination intensity in a range from about 10 milliwatts per square centimeter (mW/cm$^2$) to about 100 mW/cm$^2$ or by irradiating ultraviolet rays having an energy of 1 Joule (J) or more, but the present inventive concept is not limited thereto.

The forming of the liquid crystal layer may be performed by injecting a liquid crystal composition into a space between the first preliminary liquid crystal alignment layer and the second preliminary liquid crystal alignment layer, followed by heat treatment. Here, by the heat treatment, reactive mesogen in the first preliminary liquid crystal alignment layer may be eluted as a liquid crystal layer.

The bending is deforming the first substrate and the second substrate for a surface of the liquid crystal display apparatus facing a viewer to have a concave shape in view of the viewer. That is, in the method of manufacturing a liquid crystal display apparatus according to an exemplary embodiment of the present inventive concept, the first substrate may be relatively close to a viewer.

The term "$C_1$-$C_{20}$ alkyl group" as used herein refers to a linear or branched aliphatic hydrocarbon monovalent group having 1 to 20 carbon atoms. Examples thereof include a methyl group, an ethyl group, a propyl group, an iso-butyl group, a sec-butyl group, a tert-butyl group, a pentyl group, an iso-amyl group, and a hexyl group.

The term "$C_1$-$C_{20}$ alkoxy group" as used herein refers to a monovalent group represented by —$OA_{101}$ (wherein $A_{101}$ is a $C_1$-$C_{20}$ alkyl group). Examples thereof include a methoxy group, an ethoxy group, and an isopropyloxy group.

The term "$C_5$-$C_{60}$ carbocyclic group" as used herein refers to a monocyclic or polycyclic group having 5 to 60 carbon atoms only as ring-forming atoms. The $C_5$-$C_{60}$ carbocyclic group may be an aromatic carbocyclic group or a non-aromatic carbocyclic group. The term "$C_5$-$C_{60}$ carbocyclic group" as used herein refers to a ring (e.g., a benzene group), a monovalent group (e.g., a phenyl group), or a divalent group (e.g., a phenylene group). In an exemplary embodiment of the present inventive concept, depending on the number of substituents connected to the $C_5$-$C_{60}$ carbocyclic group, the $C_5$-$C_{60}$ carbocyclic group may be a trivalent group or a quadrivalent group.

The term "$C_1$-$C_{60}$ heterocyclic group" as used herein refers to a group having substantially the same structure as the $C_5$-$C_{60}$ carbocyclic group, except that at least one heteroatom selected from N, O, Si, P, and S is used as a ring-forming atom, in addition to carbon atoms (e.g., 1 to 60 carbon atoms).

As apparent from the foregoing description, according to an exemplary embodiment of the present inventive concept, the liquid crystal display apparatus may have less discoloration and an enhanced VHR.

It should be understood that exemplary embodiments of the present inventive concept described herein should be considered in a descriptive sense only and not for purposes of limitation. Descriptions of features or aspects within each exemplary embodiment should typically be considered as available for other similar features or aspects in other embodiments.

While specific exemplary embodiments have been described with reference to the figures, it will be understood by those of ordinary skill in the art that various changes in form and details may be made therein without departing from the spirit and scope as defined by the following claims.

What is claimed is:

1. A liquid crystal display (LCD) apparatus comprising:
   a first substrate;
   a second substrate facing the first substrate;
   a liquid crystal layer disposed between the first substrate and the second substrate;
   a first liquid crystal alignment layer disposed between the first substrate and the liquid crystal layer; and
   a second liquid crystal alignment layer disposed between the second substrate and the liquid crystal layer,
   wherein the first liquid crystal alignment layer comprises a first ion adsorbing group, and the second liquid crystal alignment layer comprises a second ion adsorbing group,
   wherein
   a content in weight percent of the first ion adsorbing group in the first liquid crystal alignment layer is different from that of the second ion adsorbing group in the second liquid crystal alignment layer, or
   a chemical structure of the first ion adsorbing group is different from that of the second ion adsorbing group, and
   wherein the first ion adsorbing group and the second ion adsorbing group are each represented by Formula 1:

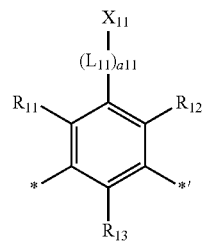

Formula 1 in Formula 1,
$X_{11}$ is a substituted or unsubstituted $C_1$-$C_{60}$ heterocyclic group,
$L_{11}$ is *—$\{C(R_{14})(R_{15})\}_{n11}$—C(=O)O—$\{C(R_{16})(R_{17})\}_{n12}$—*', *—$\{C(R_{14})(R_{15})\}_{n11}$—OC(=O)—$\{C(R_{16})(R_{17})\}_{n12}$—*',
n11 and n12 are each independently 0, 1, 2, or 3, all is 0, 1, 2, or 3, $R_{11}$ to $R_{17}$ are each independently hydrogen, deuterium, —F, —Cl, —Br, —I, a hydroxyl group, a cyano group, a nitro group, a substituted or unsubstituted $C_1$-$C_{20}$ alkyl group, a substituted or unsubstituted $C_1$-$C_{20}$ alkoxy group, a substituted or unsubstituted $C_5$-$C_{60}$ carbocyclic group, or a substituted or unsubstituted $C_1$-$C_{60}$ heterocyclic group, and and *' may each indicate a binding site to an adjacent atom.

2. The LCD apparatus of claim 1, wherein
the chemical structure of the first ion adsorbing group is identical to that of the second ion adsorbing group, and the content in weight percent of the first ion adsorbing group in the first liquid crystal alignment layer is different from that of the second ion adsorbing group in the second liquid crystal alignment layer, or
the chemical structure of the first ion adsorbing group is different from that of the second ion adsorbing group, and the content in weight percent of the first ion adsorbing group in the first liquid crystal alignment layer is identical to that of the second ion adsorbing group in the second liquid crystal alignment layer.

3. The LCD apparatus of claim 1, wherein
the chemical structure of the first ion adsorbing group is identical to that of the second ion adsorbing group, and the content in weight percent of the first ion adsorbing group in the first liquid crystal alignment layer is greater than that of the second ion adsorbing group in the second liquid crystal alignment layer, or
an ion adsorbing capability of the first ion adsorbing group is higher than that of the second ion adsorbing group, and the content in weight percent of the first ion adsorbing group in the first liquid crystal alignment layer is identical to that of the second ion adsorbing group in the second liquid crystal alignment layer.

4. The LCD apparatus of claim 1, wherein the first ion adsorbing group and the second ion adsorbing group are each represented by one of Formulae 1-1 to 1-16:

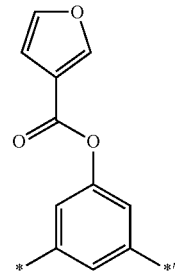

1-1

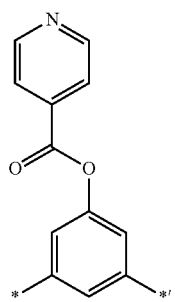

1-2

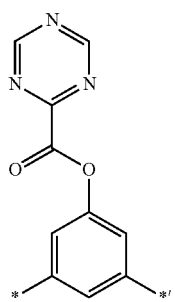

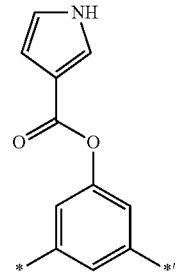

1-3

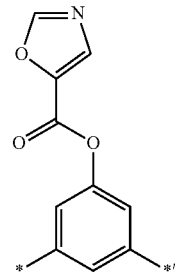

1-4

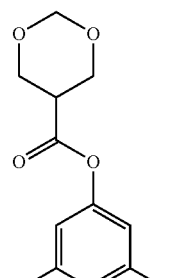

1-5

1-6

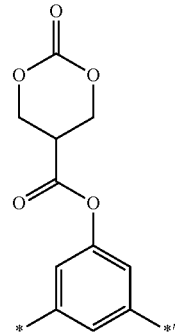

1-7 in Formulae 1-1 to 1-16,
* and *' each indicates a binding site to an adjacent atom.

5. The LCD apparatus of claim 1, wherein the first liquid crystal alignment layer and the second liquid crystal alignment layer further comprise a mesogen, and
a content in weight percent of the mesogen of the first liquid crystal alignment layer is different from that of the second liquid crystal alignment layer.

6. The LCD apparatus of claim 1, wherein the first liquid crystal alignment layer and the second liquid crystal alignment layer further comprise a mesogen, and
a content in weight percent of the mesogen of the first liquid crystal alignment layer is smaller than that of the second liquid crystal alignment layer.

7. The LCD apparatus of claim 1, wherein the first liquid crystal alignment layer does not comprise a polymerization initiating group, and the second liquid crystal alignment layer further comprises a polymerization initiating group.

8. The LCD apparatus of claim 7, wherein the polymerization initiating group is represented by one of Formulae 2-1 to 2-6:

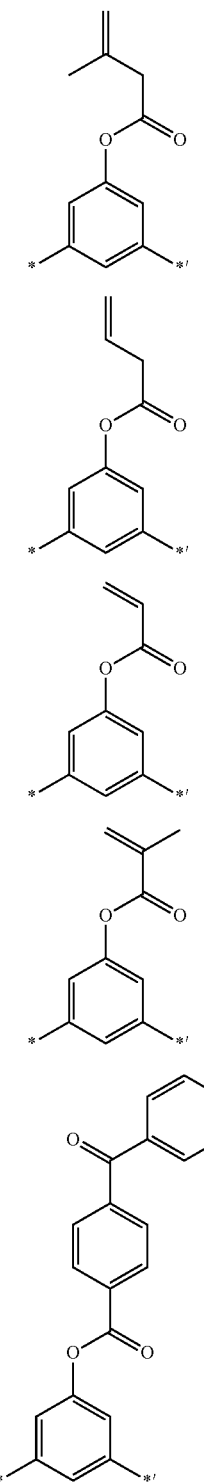

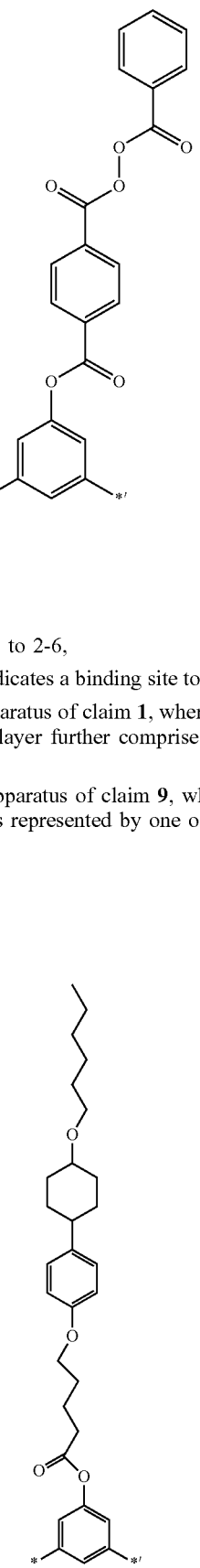

in Formulae 2-1 to 2-6,

\* and \*' each indicates a binding site to an adjacent atom.

9. The LCD apparatus of claim 1, wherein the first liquid crystal alignment layer further comprises a vertical alignment group.

10. The LCD apparatus of claim 9, wherein the vertical alignment group is represented by one of Formulae 4-1 to 4-4:

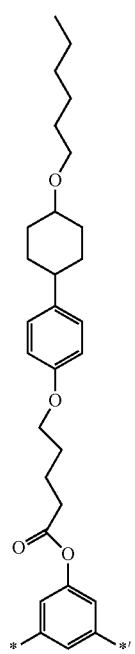

4-2

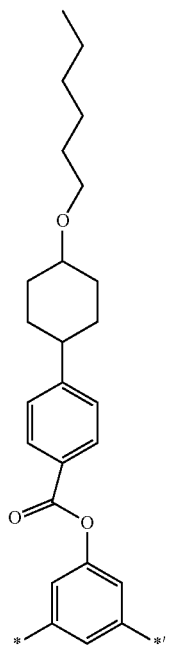

4-3

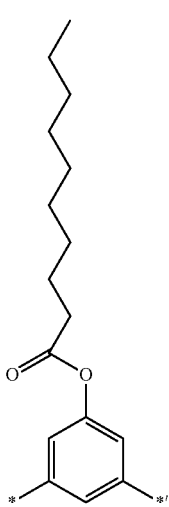

4-4

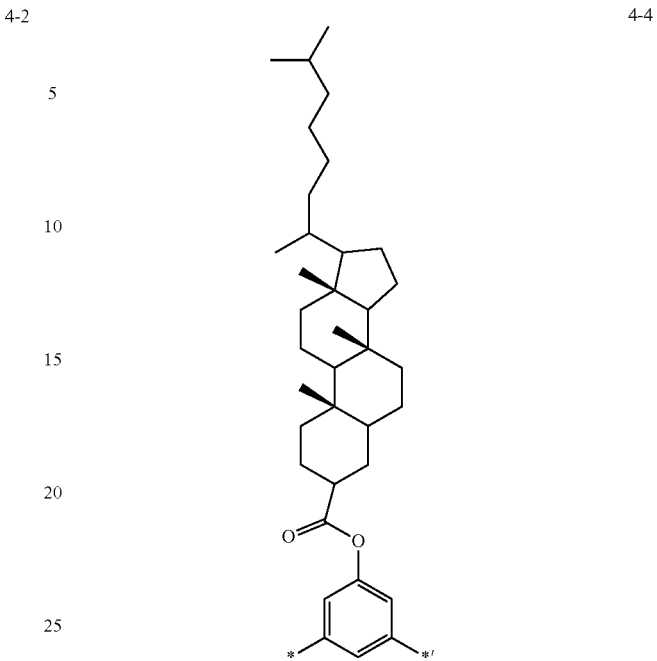

in Formulae 4-1 to 4-4,

* and *' each indicates a binding site to an adjacent atom.

11. The LCD apparatus of claim 1, wherein the first liquid crystal alignment layer and the second liquid crystal alignment layer each comprises an imide repeating unit.

12. The LCD apparatus of claim 1, wherein at least a portion of the first substrate and at least a portion of the second substrate each comprises a curved shape.

13. The LCD apparatus of claim 1, further comprising:
a common electrode disposed between the first substrate and the first liquid crystal alignment layer; and
a pixel electrode disposed between the second substrate and the second liquid crystal alignment layer.

14. An LCD apparatus comprising:
a first curved substrate;
a second curved substrate facing the first curved substrate;
a liquid crystal layer disposed between the first curved substrate and the second curved substrate;
a first liquid crystal alignment layer disposed between the first curved substrate and the liquid crystal layer; and
a second liquid crystal alignment layer disposed between the second curved substrate and the liquid crystal layer,
wherein the first liquid crystal alignment layer comprises a first ion adsorbing group, and the second liquid crystal alignment layer comprises a second ion adsorbing group,
wherein
a content in weight percent of the first ion adsorbing group in the first liquid crystal alignment layer is different from that of the second ion adsorbing group in the second liquid crystal alignment layer, or
the first ion adsorbing group is different from the second ion adsorbing group, and
wherein the first ion adsorbing group and the second ion adsorbing group are each represented by Formula 1:

Formula 1

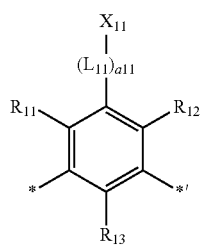

in Formula 1, $X_{11}$ is a substituted or unsubstituted $C_1$-$C_{60}$ heterocyclic group, $L_{11}$ is *—$\{C(R_{14})(R_{15})\}_{n11}$—$C(=O)O$—$\{C(R_{16})(R_{17})\}_{n12}$—*', *—$\{C(R_{14})(R_{15}))\}_{n11}$—$OC(=O)$—$\{C(R_{16})(R_{17})\}_{n12}$—*', n11 and n12 are each independently 0, 1, 2, or 3, a11 is 0, 1, 2, or 3, $R_{11}$ to $R_{17}$ are each independently hydrogen, deuterium, —F, —Cl, —Br, —I, a hydroxyl group, a cyano group, a nitro group, a substituted or unsubstituted $C_1$-$C_{20}$ alkyl group, a substituted or unsubstituted $C_1$-$C_{20}$ alkoxy group, a substituted or unsubstituted $C_5$-$C_{60}$ carbocyclic group, or a substituted or unsubstituted $C_1$-$C_{60}$ heterocyclic group, and and *' may each indicate a binding site to an adjacent atom.

15. The LCD apparatus of claim 14, wherein a chemical structure of the first ion adsorbing group is identical to that of the second ion adsorbing group, and the content in weight percent of the first ion adsorbing group in the first liquid crystal alignment layer is different from that of the second ion adsorbing group in the second liquid crystal alignment layer, or the chemical structure of the first ion adsorbing group is different from that of the second ion adsorbing group, and the content in weight percent of the first ion adsorbing group in the first liquid crystal alignment layer is identical to that of the second ion adsorbing group in the second liquid crystal alignment layer.

16. The LCD apparatus of claim 14, wherein a chemical structure of the first ion adsorbing group is identical to that of the second ion adsorbing group, and the content in weight percent of the first ion adsorbing group in the first liquid crystal alignment layer is greater than that of the second ion adsorbing group in the second liquid crystal alignment layer, or an ion adsorbing capability of the first ion adsorbing group is higher than that of the second ion adsorbing group, and the content in weight percent of the first ion adsorbing group in the first liquid crystal alignment layer is identical to that of the second ion adsorbing group in the second liquid crystal alignment layer.

17. The LCD apparatus of claim 16, wherein the first liquid crystal alignment layer does not comprise a polymerization initiating group, and the second liquid crystal alignment layer further comprises a polymerization initiating group.

18. The LCD apparatus of claim 14, wherein the first ion adsorbing group and the second ion adsorbing group are each represented by one of Formulae 1-1 to 1-16:

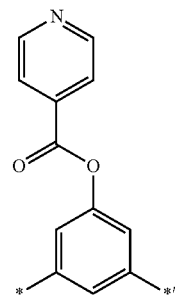

1-1

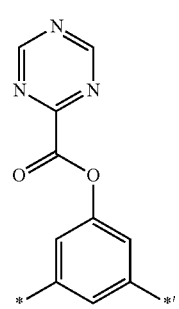

1-2

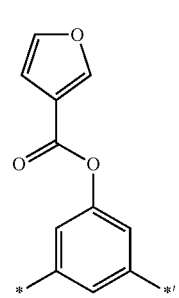

1-3

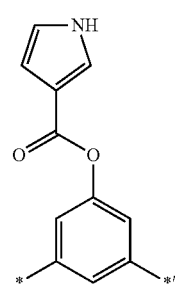

1-4

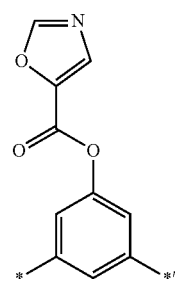

1-5

1-6
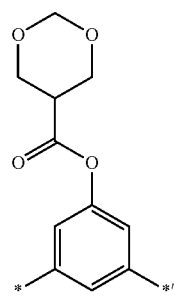
1-7
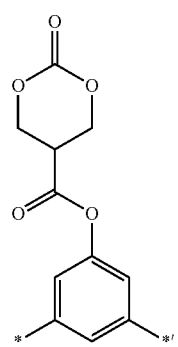
1-8
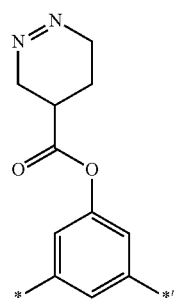
1-9
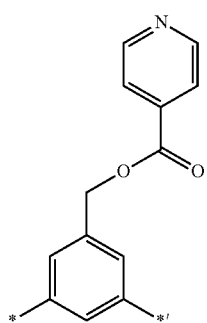
1-10
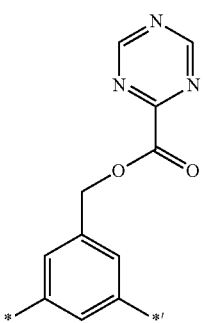
1-11
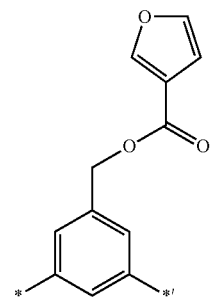
1-12
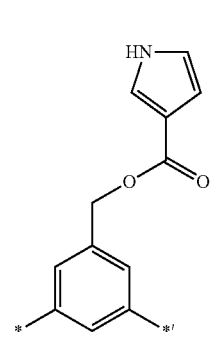
1-13
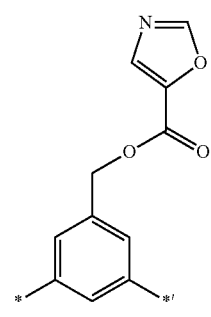
1-14
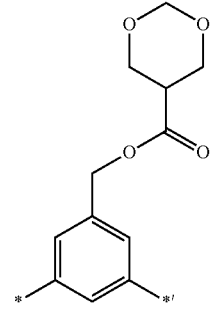
1-15
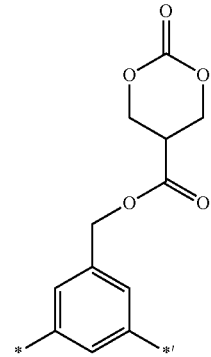

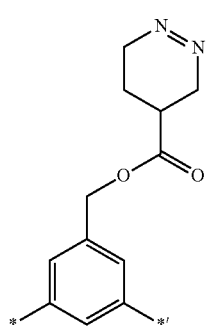
1-16
in Formulae 1-1 to 1-16,
* and *' each indicates a binding site to an adjacent atom.
* * * * *